United States Patent Office 2,776,186
Patented Jan. 1, 1957

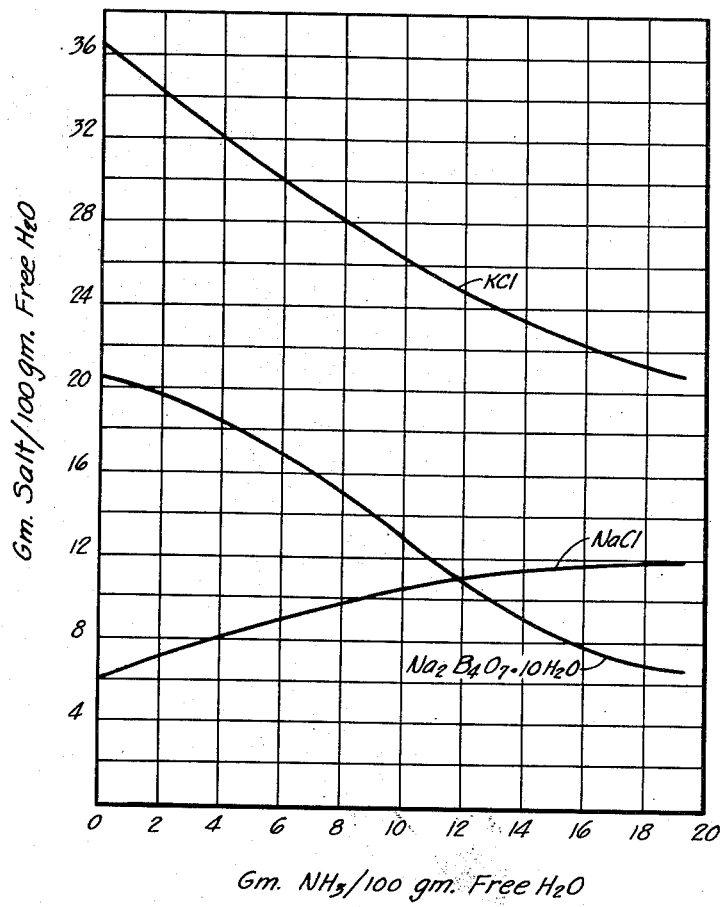

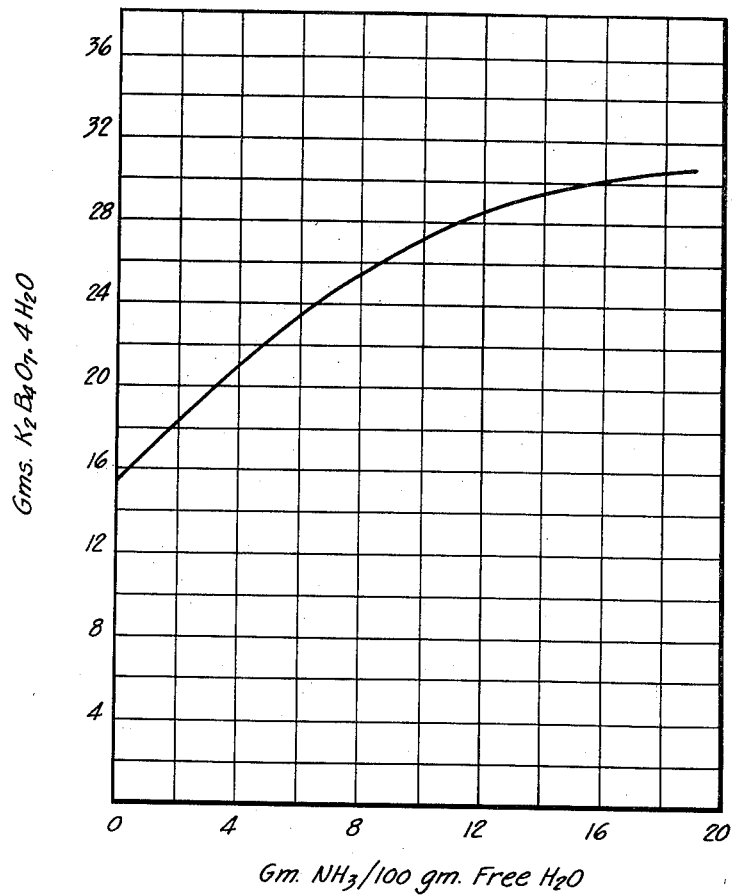

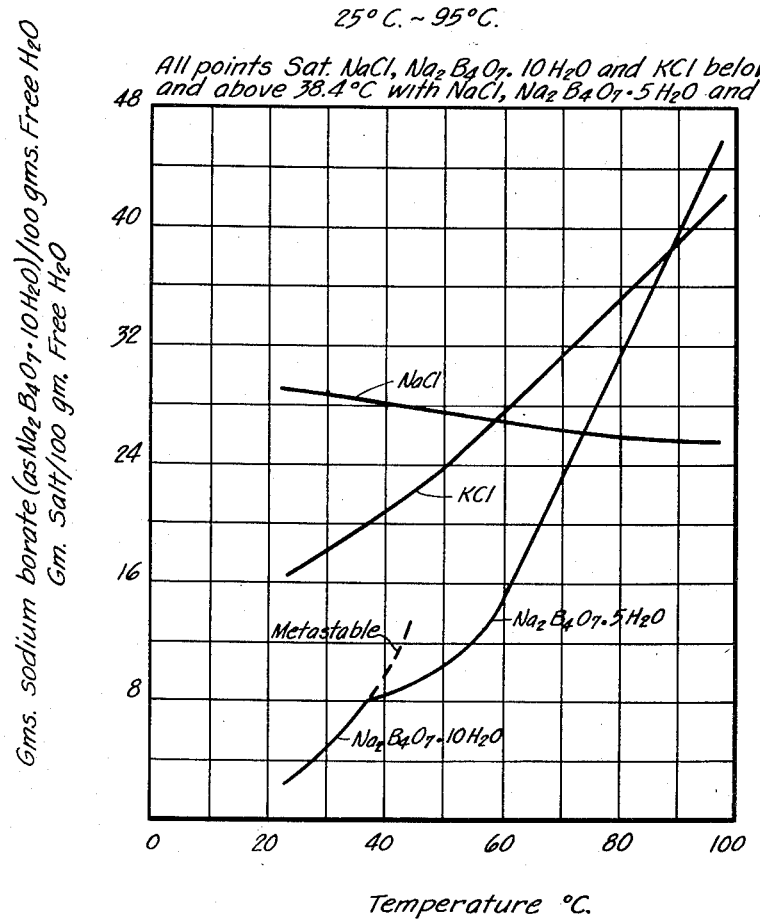

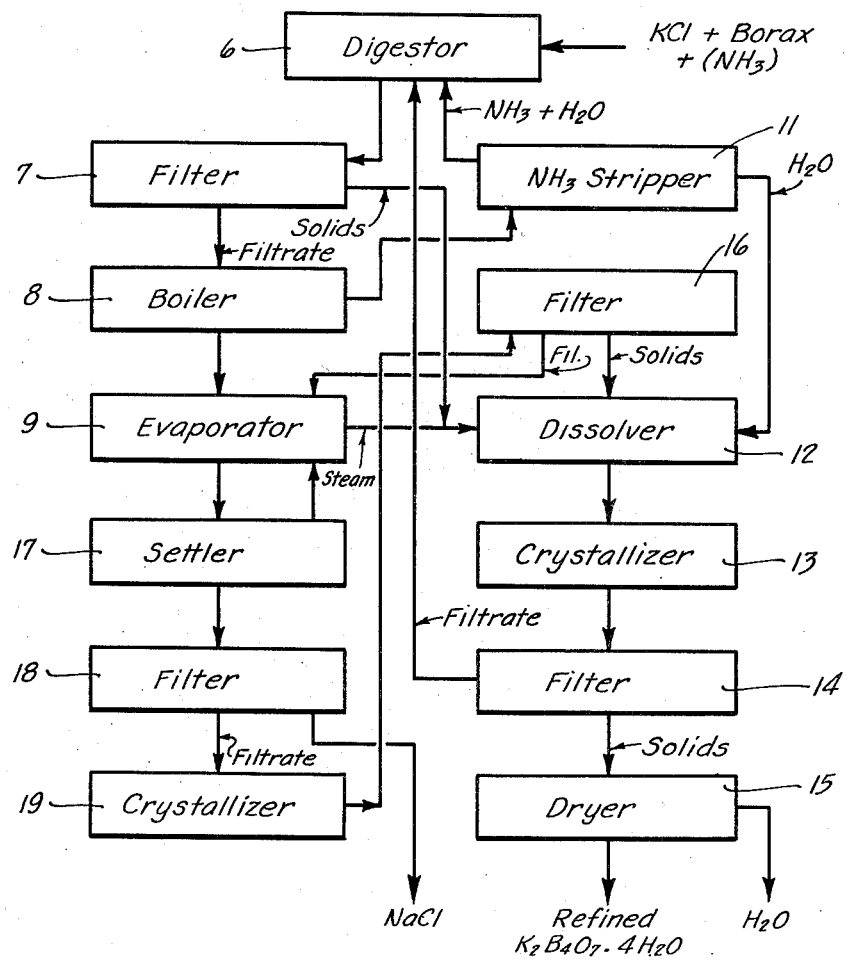

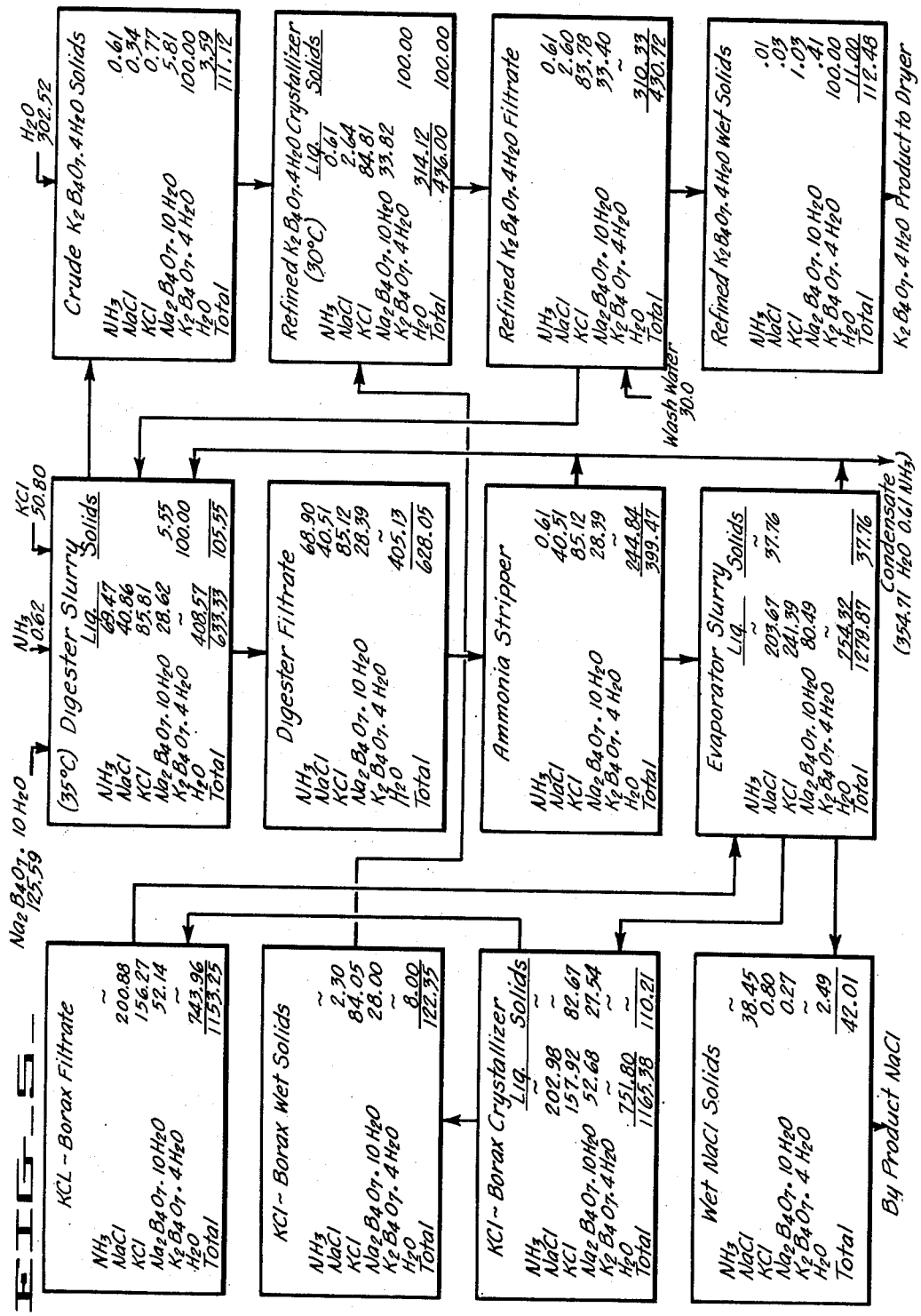

2,776,186

PROCESS FOR PRODUCTION OF POTASSIUM TETRABORATE

Frank H. May, Whittier, Calif., assignor to American Potash & Chemical Corporation, a corporation of Delaware Application May 10, 1954, Serial No. 428,480

8 Claims. (Cl. 23—59)

This invention relates to the manufacture of potassium tetraborate, $K_2B_4O_7 \cdot 4H_2O$. More particularly, the invention relates to a simple process enabling potassium tetraborate to be manufactured in a single step and from readily available raw materials which are of low cost.

I have found that one can react sodium tetraborate decahydrate with potassium chloride to produce potassium tetraborate and sodium chloride, in accordance with the following reaction:

(1) $Na_2B_4O_7 \cdot 10H_2O + 2KCl \rightarrow K_2B_4O_7 \cdot 4H_2O + 2NaCl$

To provide an economical process, it is desirable that the potash and borate values, remaining in the end liquor following precipitation and recovery of the potassium tetraborate, be recovered. Further, I have observed that if one attempts this reaction in only aqueous solution, the potash and borate values in the end liquor are of sufficiently high value and the yield of potassium tetraborate is so low that the end liquor must be reprocessed to recover the potash and borate values. Such reprocessing is involved and relatively expensive, e. g., one method includes the conversion of the borax remaining in the mother liquor to $K_2B_{10}O_{16} \cdot 8H_2O$ and conversion of this to potassium tetraborate by reaction with a sodium or potassium alkali, e. g., the hydroxide, carbonate or bicarbonate. Such reprocessing thus provides a two-step process wherein potassium tetraborate is manufactured directly by the reaction of the Equation 1 above, while an additional amount is manufactured by one of the reactions as follows:

(2) a. $2K_2B_{10}O_{16} \cdot 8H_2O + 6NaOH + 19H_2O \rightarrow$
$2K_2B_4O_7 \cdot 4H_2O + 3Na_2B_4O_7 \cdot 10H_2O$ b. $2K_2B_{10}O_{16} \cdot 8H_2O + 3Na_2CO_3 + 22H_2O \rightarrow$
$2K_2B_4O_7 \cdot 4H_2O + 3Na_2B_4O_7 \cdot 10H_2O + 3CO_2$ c. $2K_2B_{10}O_{16} \cdot 8H_2O + 6NaHCO_3 + 19H_2O \rightarrow$
$2K_2B_4O_7 \cdot 4H_2O + 3Na_2B_4O_7 \cdot 10H_2O + 6CO_2$ In the above, potassium hydroxide, carbonate or bicarbonate can be utilized to advantage in place of the sodium compound to provide further potassium tetraborate.

I have now discovered that if one carries on Equation 1 in an ammoniacal solution, then the potash and borate values remaining in the end liquor, after precipitation and separation of the potassium tetraborate, are sufficiently low that these values need not be recovered to provide an economical process and, in addition, the yield of potassium tetraborate is increased materially as compared to operation in only an aqueous solution. While recovery of the potash and borate values is not economically necessary, such recovery may be desirable and the process in this case becomes cyclic; an improved method for the recovery of these values is a part of this invention.

It is in general the broad object to provide a novel process for the manufacture of potassium tetraborate from raw materials of low value by a simple process.

The invention includes other objects and features of advantage, some of which, together with the foregoing, will appear hereinafter wherein the present preferred manner of practicing the invention is set forth. In the drawings accompanying and forming a part hereof, Figure 1 shows the composition of solution saturated with potassium tetraborate, potassium chloride and borax at 35° C. with different ammonia concentrations, the system including these salts, water and NaCl.

Figure 2 shows the potassium tetraborate produced at various ammonia concentrations.

Figure 3 shows the solubility of sodium chloride, potassium chloride, sodium tetraborate pentahydrate and borax at various temperatures from 25° to 95° in the system indicated on the figure. These relative solubilities provide the basis for the separation and recovery of the potash and boron values in the end liquor.

Figure 4 is a schematic flow sheet, showing a cyclic process useful in practicing this invention.

Figure 5 is a material balance on a cyclic process.

Referring to the drawings, and particularly to Figure 1, it is to be noted that the solubility of both sodium borate decahydrate and potassium chloride decrease with increasing ammonia concentrations, while the solution composition in terms of sodium chloride increases; the sodium chloride content is a measure of the $K_2B_4O_7$ produced by reaction 1. From Figure 2, one can ascertain the increase in yield of the desired potassium tetraborate for ammonia concentrations up to 20 grams of the $NH_3$ per 100 grams of free water. From these, it will be observed that the addition of ammonia decreases the potassium chloride and borax content of the mother liquor while the yield of the desired potassium tetraborate is increased. A small amount of ammonia is effective but the preferred range is from 10 to 20 grams of ammonia per each 100 ml. of free water.

Comparing the values shown in Figures 1 and 2, it is to be noted that as the ammonia concentration is increased at 35° C., so is the yield of potassium tetraborate, while the amount of borax and potassium chloride present in the mother liquor decreases. This points out the advantage of working in an ammoniacal solution. As the preferred temperature of operation, I have utilized 35° C. although one can utilize temperatures between 20° and 45° C. with good efficiency at atmospheric pressure and above 45° C. if one works with super-atmospheric pressure.

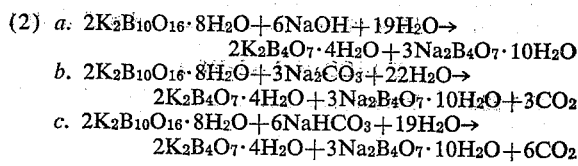

From Figure 3, it will be noted that with increasing temperature, the solubility of both sodium borates and potassium chloride increases as the temperature is increased, while the solubility of sodium chloride decreases only slightly. This provides the information on relative solubilities necessary to separation and recovery of the potash and boron in a cyclic process.

To carry out the process on a cyclic basis, appropriate quantities of potassium chloride and borax along with recycled end liquors are reacted together in a digester 6 under suitable conditions (25-35° C.) and, utilizing the flow-sheet of Figure 4, to produce a slurry of solid potassium tetraborate ($K_2B_4O_7 \cdot 4H_2O$). These solids are separated by filtration in filter 7; the filtrate is advanced through a boiler 8 to an evaporator 9 for recovery of the ammonia values which are finally recycled to the digester 6 from ammonia stripper 11, while the crude solids are dissolved in dissolver 12 in water containing controlled amounts of potassium chloride and borax and recrystallized at 13, filtered at 14, and dried at 15 to produce a refined crop of $K_2B_4O_7 \cdot 4H_2O$ as a final product.

The refined potassium tetraborate filtrate from filter 14 is recycled to the digester 6 as make-up liquor to complete the reaction cycle.

The ammonia stripped liquor is further processed for recovery of the potash and boron values by blending liquor from evaporator 9 with a recycled end liquor from filter 16 and evaporating to concentrate and crystallize a crop of solid sodium chloride utilizing settler 17 at an elevated temperature, preferably above 75° C., the sodium chloride solids being settled, counter-washed with recycled end liquor and filtered in filter 18, as by-product. The hot, undiluted filtrate from the sodium chloride solids is cooled to 30–35° C. utlizing crystallizer 19, to crystalize a mixed crop of potassium chloride and borax. These solids are filtered in filter 16 and returned to the dissolver 12 of the process while the filtrate is recycled to the evaporator 9 to complete the process.

As a specific illustration of the practice of the present invention, the following is set forth by way of example but not by way of limitation.

To 89 pounds of $H_2O$ were added 17 pounds $NH_3$, 35 pounds KCl, and 47 pounds of borax $$(Na_2B_4O_7.10H_2O)$$

This solution was heated to a temperature between 20° C. and 50° C., 35° C. being the preferred temperature. The solution was stirred for from one to two hours and the precipitated crop of $K_2B_4O_7.4H_2O$ crystals was removed from the mother liquor by centrifuging or filtration. I obtain a yield of 31.9 pounds of $K_2B_4O_7.4H_2O$ of approximately 90–95% purity. This crop can be purified by recrystallization, in which case the end liquor from the recrystallization may be used as a starting liquor for another cycle. I obtain by recrystallization $$K_2B_4O_7.4H_2O$$

of 99.5% purity. Approximately 87% of the $$Na_2B_4O_7.10H_2O$$

was converted to $K_2B_4O_7.4H_2O$ since analysis shows that of the 47 pounds of $Na_2B_4O_7.10H_2O$ originally added to the reaction mixture, only 6.23 pounds remained in the mother liquor after completion of the reaction.

A complete material balance for a cyclic process is set forth in Figure 5, the digester operating at 35° C. and the refined $K_2B_4O_7$ crystallizer at 30° C. All units are on a weight basis, e. g., grams, pounds, or tons, and are taken from plant operations.

From the foregoing, I believe it will be apparent that I have provided a relatively simple, novel and improved process for obtaining potassium tetraborate from relatively inexpensive starting materials and by a relatively simple and economical process.

I claim:

1. A process for making potassium tetraborate from borax comprising reacting borax with potassium chloride in an aqueous solution containing ammonia to precipitate potassium tetraborate.

2. A process for making potassium tetraborate from borax comprising reacting borax with potassium chloride in an aqueous solution containing from 10 to 20 grams of ammonia per 100 grams of free water to precipitate potassium tetraborate.

3. A process for making potassium tetraborate from borax comprising reacting borax at a temperature between about 20° C. and 50° C. with potassium chloride in an aqueous solution containing ammonia to precipitate potassium tetraborate.

4. A process for making potassium tetraborate from borax comprising reacting at a temperature between about 20° C. and 50° C. borax with potassium chloride in an aqueous solution containing from 10 to 20 grams of ammonia per 100 grams of free water to precipitate potassium tetraborate.

5. A process for making potassium tetraborate comprising reacting about 47 parts by weight of borax, about 35 parts by weight potassium chloride, about 17 parts by weight ammonia and 89 parts by weight water to precipitate potassium tetraborate from the solution, and separating the crystals of potassium tetraborate from the solution.

6. A process for manufacture of potassium tetraborate comprising adding a sodium borate to an ammoniacal solution of potassium chloride at a temperature of from 20° to 50° C. to form a precipitate of potassium tetraborate, and recovering the precipitated potassium tetraborate.

7. A process for manufacture of potassium tetraborate comprising adding a sodium borate to an aqueous solution of potassium chloride containing from 10 to 20 grams of ammonia per 100 grams of free water at a temperature of from 20° to 50° C. to form a precipitate of potassium tetraborate.

8. The process comprising forming a potassium borate substantially in accordance with the reaction $$Na_2B_4O_7.10H_2O + 2KCl \rightarrow K_2B_4O_7.4H_2O + 2NaCl + 6H_2O$$

in an aqueous reaction medium at a temperature of from 20° to 50° C., said aqueous reaction medium containing from 10 to 20 grams of ammonia per 100 grams of free water, continuing the reaction to precipitate potassium borate, and separating and recovering said potassium tetraborate.

References Cited in the file of this patent

UNITED STATES PATENTS

| | | |
|---|---|---|
| 1,450,975 | Kelly | Apr. 10, 1923 |
| 1,466,352 | Dolbear | Aug. 28, 1923 |
| 2,395,567 | May et al. | Feb. 26, 1946 |

FOREIGN PATENTS

| | | |
|---|---|---|
| 711,220 | France | June 23, 1931 |